Sept. 28, 1937.  A. C. WICKMAN  2,094,313
MEANS FOR CONTROLLING VARIABLE SPEED GEARS
Filed Dec. 5, 1936
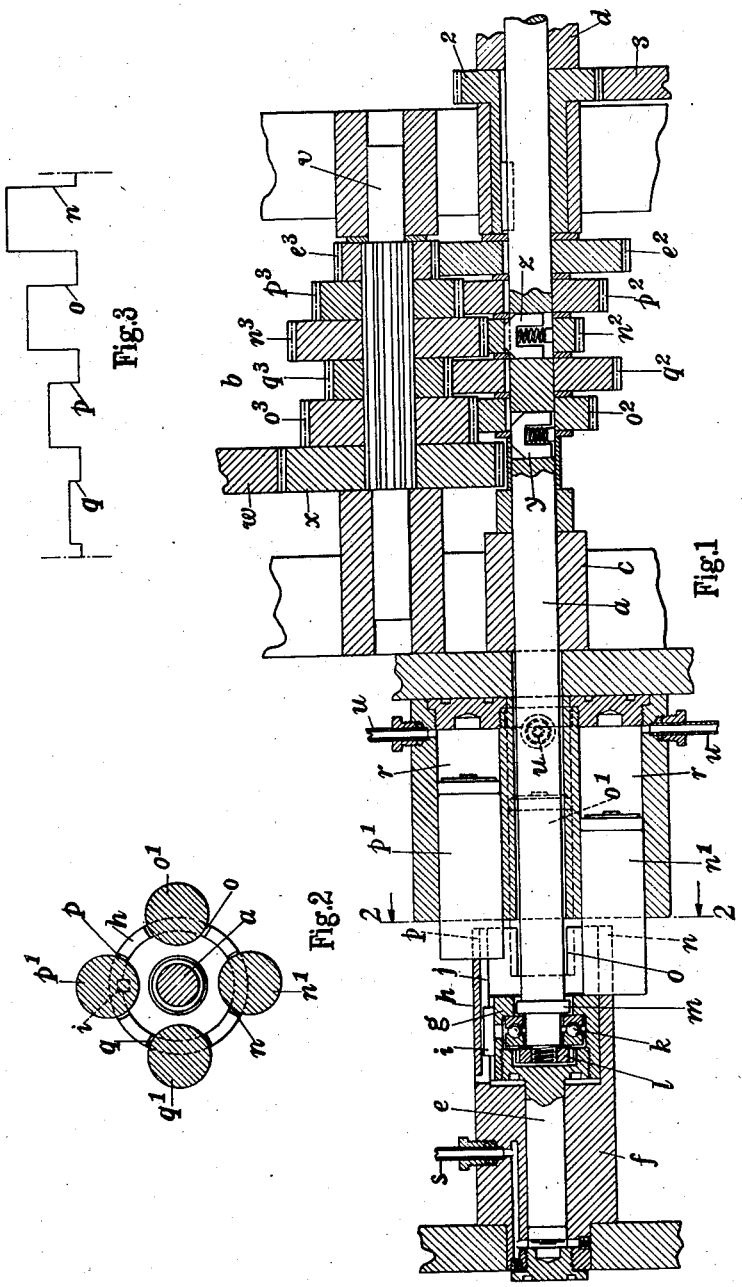

Patented Sept. 28, 1937

2,094,313

UNITED STATES PATENT OFFICE 2,094,313

MEANS FOR CONTROLLING VARIABLE SPEED GEARS

Axel Charles Wickman, Coventry, England

Application December 5, 1936, Serial No. 114,507
In Great Britain January 13, 1936

3 Claims. (Cl. 74—364)

This invention has for its object to provide improved means for controlling variable speed gears.

The invention comprises the combination of a slidable gear controlling member, a plunger carried in a fixed cylinder for moving the slidable member in one direction, this cylinder (when the apparatus is in use) being constantly supplied with pressure fluid, a plurality of abutments for determining the positions to which the said slidable member can be moved, and fluid operated means for moving the said slidable member towards the abutments in opposition to the action of the said constantly-supplied pressure fluid.

In the accompanying sheet of explanatory drawing:—

Figure 1 is a sectional elevation of a variable-speed gear provided with the invention.

Figure 2 is a cross section on the line 2—2 of Figure 1.

Figure 3 is a developed view of the abutments shown in Figure 1.

In carrying the invention into effect as shown I employ a shaft $a$ for controlling the variable-speed gear indicated generally by $b$. The shaft $a$ is slidable in bearings $c$, $d$, and is connected at one end to a plunger $e$ carried in a fixed cylinder $f$ to which (when the apparatus is in use) pressure fluid is constantly admitted through a pipe $s$. In the example shown the shaft $a$ forms the driven shaft of the variable-speed gear $b$, and the connection between this shaft and the plunger $e$ is effected by a hollow cylindrical member $g$ which is slidable in a hollow cylindrical extension $h$ of the cylinder $f$. A key $i$ on the member $g$ engages a groove $j$ in the inner surface of the extension $h$ and thereby prevents rotation of the member $g$ without affecting its sliding movement. At one end this member $g$ is screwed onto the adjacent and enlarged end of the plunger $e$, and at the other end the said member is formed with an inwardly extending annular part adapted to bear against the inner end of a thrust bearing $k$ arranged on the adjacent end of the shaft $a$ between a retaining nut $l$ and a collar $m$ on the shaft. The free end of the cylindrical extension $h$ is provided with four slots (indicated by $n$, $o$, $p$, $q$, respectively) which are illustrated in a developed condition in Figure 3. The end walls of these slots form abutments for limiting the outward movement of four plungers each preferably having an effective area of twice that of plunger $e$ (indicated by $n^1$, $o^1$, $p^1$, $q^1$ respectively) under the action of pressure fluid admitted to fixed cylinders $r$ arranged in a block around the shaft $a$ and each containing one of the said plungers. Pressure fluid admitted to any one of the cylinders $r$ through a pipe $u$, one of which is provided for each of these cylinders, causes the corresponding plunger to act on the adjacent side of the cylindrical member $g$ in opposition to the first mentioned plunger $e$.

The admission or release of fluid to or from any of the cylinders $r$ is controlled by a valve or valves (not shown) which may be moved from one position to another by hand or automatically. When fluid is admitted to any one of these cylinders it moves the corresponding plunger (e. g. the plunger $n^1$) outwards, and by the action of this plunger on the cylindrical member $g$ the slidable shaft $a$ is moved in opposition to the said constantly-supplied pressure fluid acting on the plunger $e$ until the plunger $n^1$ reaches the abutment formed by the end wall of the slot $n$, as shown, this movement of the shaft $a$ serving to effect the required change in the variable speed gear $b$ in the manner hereinafter described. To effect another gear change the fluid is released from the cylinder $r$ of the acting plunger $n^1$, and may be admitted to the cylinder $r$ of another plunger. If, as in the example shown, this condition involves a retraction of the shaft $a$, the retraction is effected by the pressure of the constantly-supplied fluid on the plunger $e$.

From the foregoing it will be seen that the slidable shaft $a$ is moved in one direction by the plunger $e$ under the pressure of the constantly-supplied fluid, and in the opposite direction by any one of the other plungers $n^1$, $o^1$, $p^1$, $q^1$, this latter movement being determined by the corresponding abutment.

In the example shown the shaft $a$ carries the gear wheels $e^2$, $n^2$, $o^2$, $p^2$, $q^2$ of the gear $b$, and these gear wheels respectively engage gear wheels $e^3$, $n^3$, $o^3$, $p^3$, $q^3$ splined on the shaft $v$ of the gear which receives its motion from a gear wheel $w$ engaging another gear wheel $x$ also splined on the shaft $v$. The shaft $a$ also carries spring controlled key pieces $y$, $z$, whereby any one of the gear wheels $e^2$, $n^2$, $o^2$, $p^2$, $q^2$ can be secured to the shaft $a$. In the position of the parts as shown the gear wheel $n^2$ is secured by the key piece $z$ to the shaft $a$, the key piece $y$ being out of action. This position of the parts is brought about by the admission of fluid under pressure to the cylinder containing the plunger $n^1$ and enables the shaft $a$ to be driven at its highest speed. To enable the shaft $a$ to be driven at a different speed the fluid is released from the cylinder $r$ of the plunger $n^1$ and admitted to another of the cylinders $r$, for example, that containing the plunger $o^1$. This causes the plunger $o^1$ to move into contact with the abutment formed by the end wall of the corresponding slot $o$, and the shaft $a$ to be moved in the opposite direction by the plunger $e$ under the pressure of the constantly-supplied fluid until the cylindrical member $g$ abuts against the adjacent end of the plunger $o^1$. In this position of the parts the gear wheel $o^2$ is secured to the shaft $a$ by the key piece $y$, and the key piece $z$ is out of action. Further speeds of the shaft $a$ may be obtained by releasing the fluid from the cylinder $r$ of the plunger $o^1$ and admitting the fluid to either of the other cylinders $r$. A still further speed may be obtained simply by releasing the fluid from the cylinder $r$ of the acting plunger. This enables the shaft $a$ to be moved by the plunger $e$ into a position in which the cylindrical member $g$ abuts against the adjacent side of the block of cylinders $r$. In this position the gear wheel $e^2$ is secured to the shaft $a$ by the key piece $z$ and the shaft is driven at its lowest speed. If it is now required to increase the speed of the shaft $a$, pressure fluid is admitted to any one of the cylinders $r$, and the corresponding plunger is thereby caused to move the shaft against the action of the plunger $e$ until movement of the operating plunger is arrested by the corresponding abutment.

On the end of the shaft $a$ adjacent to the bearing $d$ is keyed a gear wheel 2 which engages another gear wheel 3 for enabling the motion of the shaft to be transmitted to the part to be driven.

By this invention the actuation of a slidable gear controlling member can be effected in a very simple and convenient manner.

The invention is not limited to the examples above described, as subordinate details may be varied to suit different requirements, but in all cases the movement of the slidable member is effected in one direction by a plunger subjected to constantly-supplied fluid pressure, and in the other direction by additional fluid operated means, the latter movement being limited by suitably arranged abutments.

Having thus described my invention what I claim as new and desire to secure by Letters Patent is:—

1. Means for controlling variable-speed gears, comprising the combination of a slidable gear controlling member, a slidable fluid operated member for moving the said gear controlling member in one direction under the action of constantly supplied pressure fluid, a plurality of additional fluid operated members for moving the said gear controlling member in the opposite direction against the action of the first mentioned fluid operated member, and a plurality of abutments for determining the positions to which the said gear controlling member can be moved by the said additional fluid operated plungers.

2. Means for controlling variable-speed gears, comprising the combination of a slidable gear controlling member, a fixed cylinder, a plunger slidable in the said cylinder for moving the said gear controlling member in one direction under the action of pressure fluid constantly supplied to the said cylinder, a plurality of additional fluid operated plungers for moving the said gear controlling member in the opposite direction against the action of the first mentioned plunger, and a hollow member associated with the said cylinder and adapted at one end to provide a plurality of abutments for determining the positions to which the said gear controlling member can be moved by the said additional fluid operated plungers.

3. Means for controlling variable-speed gears, comprising the combination of a slidable and rotatable gear controlling shaft, a fixed cylinder, a non-rotatable plunger slidable in the said cylinder for sliding the said shaft in one direction under the action of pressure fluid constantly supplied to the said cylinder, a slidable cylindrical member interconnecting the said shaft and plunger, a plurality of additional fixed cylinders, a plurality of additional plungers slidable in the said additional fixed cylinders and adapted to act on the said cylindrical member for sliding the said shaft in the opposite direction against the action of the first mentioned plunger, a fixed hollow cylindrical part associated with one end of the first mentioned fixed cylinder and containing the said cylindrical member, and a plurality of abutments formed by one end of the said hollow cylindrical part for determining by contact with the said additional plungers the positions to which the said shaft can be moved by the said additional plungers.

AXEL CHARLES WICKMAN.